US012308530B2

(12) United States Patent
Lo et al.

(10) Patent No.: US 12,308,530 B2
(45) Date of Patent: May 20, 2025

(54) ANTENNA STRUCTURE

(71) Applicant: Quanta Computer Inc., Taoyuan (TW)

(72) Inventors: Yi-Chih Lo, Taoyuan (TW); Chung-Ting Hung, Taoyuan (TW); Chun-Yuan Wang, Taoyuan (TW); Chun-I Chen, Taoyuan (TW); Jing-Yao Xu, Taoyuan (TW); Yan-Cheng Huang, Taoyuan (TW); Chu-Yu Tang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 240 days.

(21) Appl. No.: 18/153,745

(22) Filed: Jan. 12, 2023

(65) Prior Publication Data

US 2024/0195082 A1 Jun. 13, 2024

(30) Foreign Application Priority Data

Dec. 7, 2022 (TW) ................................ 111146909

(51) Int. Cl.
*H01Q 21/30* (2006.01)
*H01Q 21/28* (2006.01)

(52) U.S. Cl.
CPC ............ *H01Q 21/30* (2013.01); *H01Q 21/28* (2013.01)

(58) Field of Classification Search
USPC ........................................................ 343/702
See application file for complete search history.

(56) References Cited

U.S. PATENT DOCUMENTS 6,552,686 B2 * 4/2003 Ollikainen ........... H01Q 9/0421 343/702
9,954,271 B2 * 4/2018 Hsieh ..................... H01Q 1/243
10,916,847 B2 * 2/2021 Chang .................... H01Q 5/328
11,139,556 B2 * 10/2021 Huang ................... H01Q 13/10
2002/0145569 A1 * 10/2002 Onaka .................. H01Q 1/2283 343/702
2005/0168384 A1 * 8/2005 Wang ....................... H01Q 9/42 343/702

(Continued)

OTHER PUBLICATIONS

Chinese language office action dated Oct. 17, 2023, issued in application No. TW 111146909.

*Primary Examiner* — Hoang V Nguyen
*Assistant Examiner* — Brandon Sean Woods
(74) *Attorney, Agent, or Firm* — McClure, Qualey & Rodack, LLP

(57) ABSTRACT

An antenna structure includes a ground element, a feeding radiation element, a first radiation element, a second radiation element, a shorting radiation element, a third radiation element, and a fourth radiation element. The feeding radiation element has a feeding point. The first radiation element is coupled to the feeding radiation element. The second radiation element is coupled to the feeding radiation element. The second radiation element and the first radiation element substantially extend in opposite directions. The feeding radiation element is further coupled through the shorting radiation element to the ground element. The third radiation element is coupled to the ground element. The third radiation element is adjacent to the first radiation element. The fourth radiation element is coupled to the ground element. The fourth radiation element is adjacent to the second radiation element.

8 Claims, 4 Drawing Sheets

100

(56) References Cited

U.S. PATENT DOCUMENTS

| | | | | |
|---|---|---|---|---|
| 2010/0013713 A1* | 1/2010 | Peng | H01Q 9/0421 | 343/700 MS |
| 2012/0127038 A1* | 5/2012 | Kim | H01Q 9/42 | 343/700 MS |

* cited by examiner

300

ANTENNA STRUCTURE

CROSS REFERENCE TO RELATED APPLICATIONS

This application claims priority of Taiwan Patent Application No. 111146909 filed on Dec. 7, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHZ, 1800 MHZ, 1900 MHZ, 2100 MHZ, 2300 MHz, and 2500 MHz. Some devices cover a small wireless communication area; these include mobile phones using Wi-Fi systems and using frequency bands of 2.4 GHz, 5.2 GHZ, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for antenna designers to design a small-size, wideband antenna structure.

BRIEF SUMMARY OF THE INVENTION

In an exemplary embodiment, the invention is directed to an antenna structure that includes a ground element, a feeding radiation element, a first radiation element, a second radiation element, a shorting radiation element, a third radiation element, and a fourth radiation element. The feeding radiation element has a feeding point. The first radiation element is coupled to the feeding radiation element. The second radiation element is coupled to the feeding radiation element. The second radiation element and the first radiation element substantially extend in opposite directions. The feeding radiation element is further coupled through the shorting radiation element to the ground element. The third radiation element is coupled to the ground element. The third radiation element is adjacent to the first radiation element. The fourth radiation element is coupled to the ground element. The fourth radiation element is adjacent to the second radiation element.

In some embodiments, the combination of the feeding radiation element, the first radiation element, and the second radiation element substantially has a T-shape.

In some embodiments, the shorting radiation element substantially has a relatively short L-shape. The third radiation element substantially has a relatively long L-shape. The fourth radiation element substantially has a rectangular shape.

In some embodiments, a first coupling gap is formed between the third radiation element and the first radiation element. A second coupling gap is formed between the fourth radiation element and the second radiation element. The width of the first coupling gap is from 1 mm to 2 mm. The width of the second coupling gap is from 0.5 mm to 1 mm.

In some embodiments, the second radiation element further includes a first extension portion, and the first extension portion is positioned at one end of the second radiation element.

In some embodiments, the third radiation element further includes a second extension portion, and the second extension portion is positioned at a bend in the third radiation element.

In some embodiments, the antenna structure covers a first frequency band, a second frequency band, and a third frequency band. The first frequency band is substantially at 1575 MHz. The second frequency band is from 1910 MHz to 2170 MHz. The third frequency band is from 3300 MHz to 4200 MHz.

In some embodiments, the total length of the feeding radiation element and the first radiation element is substantially equal to 0.25 wavelength of the second frequency band.

In some embodiments, the length of the third radiation element is substantially equal to 0.25 wavelength of the first frequency band.

In some embodiments, the length of the fourth radiation element is shorter than 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
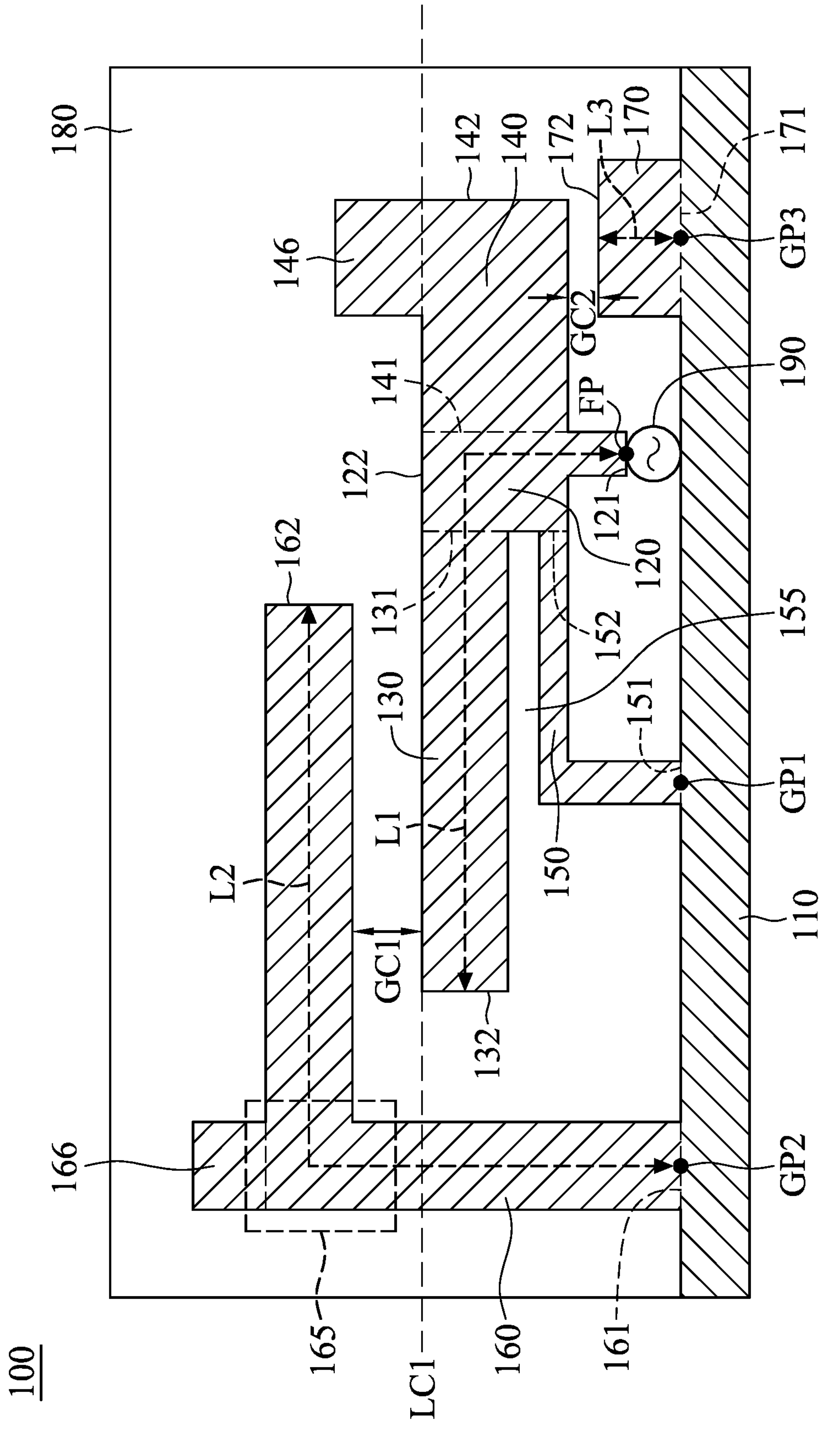
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection.

Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the invention. For example, the antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

In the embodiment of FIG. 1, the antenna structure 100 at least includes a ground element 110, a feeding radiation element 120, a first radiation element 130, a second radiation element 140, a shorting radiation element 150, a third radiation element 160, and a fourth radiation element 170. The ground element 110, the feeding radiation element 120, the first radiation element 130, the second radiation element 140, the shorting radiation element 150, the third radiation element 160, and the fourth radiation element 170 may all be made of metal materials, such as copper, silver, aluminum, iron, or their alloys.

The ground element 110 is configured to provide a ground voltage. In some embodiments, the ground element 110 is implemented with a ground copper foil, which may be further coupled to a system ground plane of the antenna structure 100 (not shown).

The feeding radiation element 120 may substantially have a variable-width straight-line shape. Specifically, the feeding radiation element 120 has a relatively narrow first end 121 and a relatively wide second end 122. A feeding point FP is positioned at the first end 121 of the feeding radiation element 120. The feeding point FP may be further coupled to a signal source 190. For example, the signal source 190 may be an RF (Radio Frequency) module for exciting the antenna structure 100. In some embodiments, a positive electrode of the signal source 190 is coupled to the feeding point FP, and a negative electrode of the signal source 190 is coupled to the ground element 110.

The first radiation element 130 may substantially have a relatively long straight-line shape. Specifically, the first radiation element 130 has a first end 131 and a second end 132. The first end 131 of the first radiation element 130 is coupled to the second end 122 of the feeding radiation element 120. The second end 132 of the first radiation element 130 is an open end.

The second radiation element 140 may substantially have a relatively short straight-line shape (in comparison to the first radiation element 130). Specifically, the second radiation element 140 has a first end 141 and a second end 142. The first end 141 of the second radiation element 140 is coupled to one side of the feeding radiation element 120. The second end 142 of the second radiation element 140 is an open end. For example, the second end 142 of the second radiation element 140 and the second end 132 of the first radiation element 130 may substantially extend away from each other in opposite directions. In some embodiments, the combination of the feeding radiation element 120, the first radiation element 130, and the second radiation element 140 substantially has a T-shape.

The shorting radiation element 150 may substantially have a relatively short L-shape. Specifically, the shorting radiation element 150 has a first end 151 and a second end 152. The first end 151 of the shorting radiation element 150 is coupled to a first grounding point GP1 on the ground element 110. The second end 152 of the shorting radiation element 150 is coupled to the opposite side of the feeding radiation element 120. That is, the feeding radiation element 120 is disposed between the shorting radiation element 150 and the second radiation element 140. Thus, the feeding radiation element 120 is further coupled through the shorting radiation element 150 to the ground element 110. In some embodiments, an open slot 155 is defined by the feeding radiation element 120, the first radiation element 130, and the shorting radiation element 150.

The third radiation element 160 may substantially have a relatively long L-shape (in comparison to the shorting radiation element 150). Specifically, the third radiation element 160 has a first end 161 and a second end 162. The first end 161 of the third radiation element 160 is coupled to a second grounding point GP2 on the ground element 110. The second end 162 of the third radiation element 160 is an open end. For example, the second end 162 of the third radiation element 160 and the second end 142 of the second radiation element 140 may substantially extend in the same direction. The third radiation element 160 is adjacent to the first radiation element 130. In some embodiments, a first coupling gap GC1 is formed between the third radiation element 160 and the first radiation element 130. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The fourth radiation element 170 may substantially have a rectangular shape. Specifically, the fourth radiation element 170 has a first end 171 and a second end 172. The first end 171 of the fourth radiation element 170 is coupled to a third grounding point GP3 on the ground element 110. The second end 172 of the fourth radiation element 170 is an open end. For example, the first grounding point GP1, the second grounding point GP2, and the third grounding point GP3 may be different from each other. The fourth radiation element 170 is adjacent to the second radiation element 140. In some embodiments, a second coupling gap GC2 is formed between the fourth radiation element 170 and the second radiation element 140.

In some embodiments, the second radiation element 140 further includes a first extension portion 146, and the first extension portion 146 is positioned at the second end 142 of the second radiation element 140. In some embodiments, the third radiation element 160 further includes a second extension portion 166, and the second extension portion 166 is positioned at a bend 165 of the third radiation element 160. For example, the first extension portion 146 and the second extension portion 166 may substantially extend in the same direction. It should be understood that the first extension portion 146 and the second extension portion 166 are merely optional components for fine-tuning the impedance matching, and they are omitted in other embodiments.

In some embodiments, the antenna structure 100 may be a planar antenna structure. Specifically, the ground element 110, the feeding radiation element 120, the first radiation element 130, the second radiation element 140, the shorting radiation element 150, the third radiation element 160, and the fourth radiation element 170 of the antenna structure 100 are all disposed on a dielectric substrate 180. For example, the dielectric substrate 180 may be an FR4 (Flame Retardant 4) substrate, a PCB (Printed Circuit Board), or an FPC (Flexible Printed Circuit).

Figure 2:
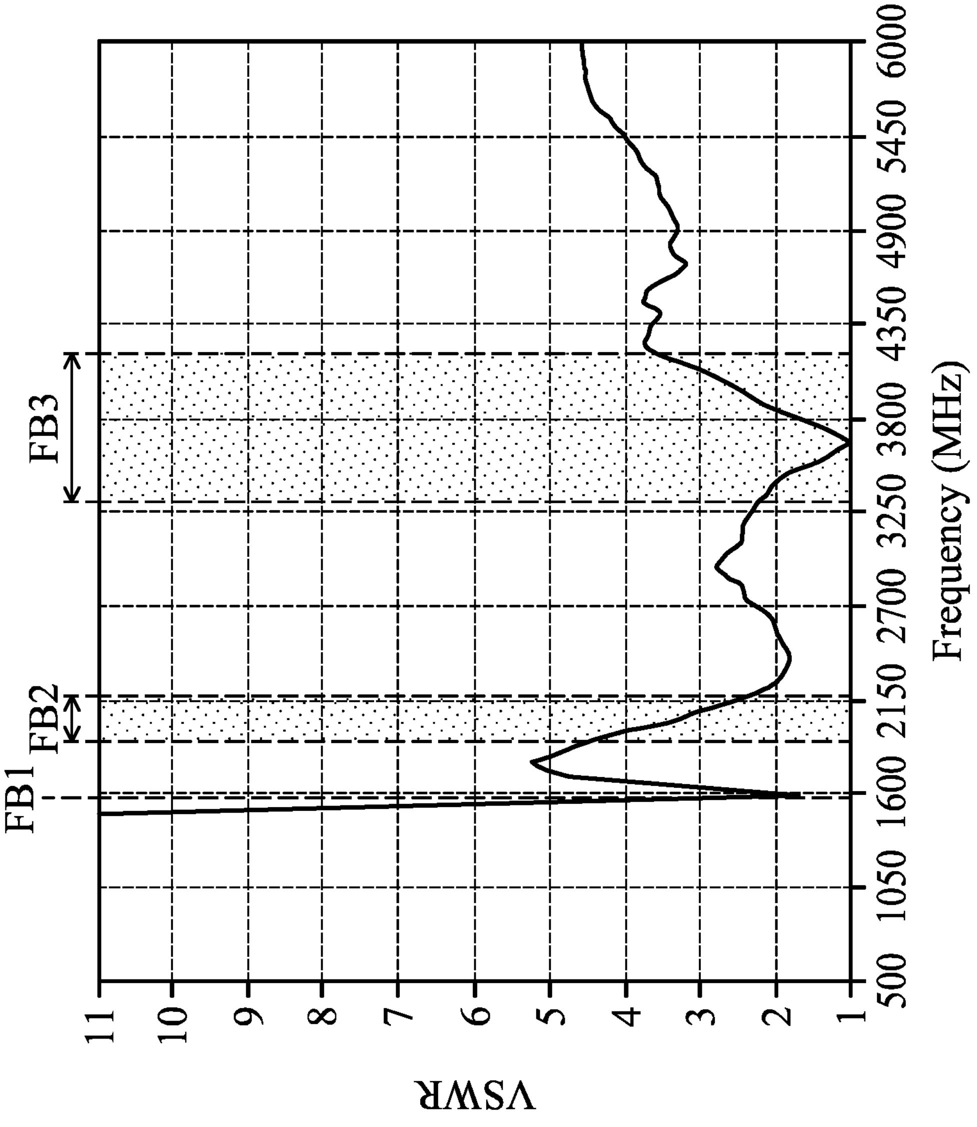
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurements in FIG. 2, the antenna structure 100 can cover a first frequency band FB1, a second frequency band FB2, and a third frequency band FB3. For example, the first frequency band FB1 may be substantially at 1575 MHz, the second frequency band FB2 may be from 1910 MHz to 2170 MHz, and the third frequency band FB3 may be from 3300 MHz to 4200 MHz. Therefore, the antenna structure 100 can support the wideband operations of both LTE (Long Term Evolution) and GPS (Global Positioning System).

In some embodiments, the operational principles of the antenna structure 100 are as follows. The feeding radiation element 120 and the first radiation element 130 are excited to generate the second frequency band FB2. The third radiation element 160 is excited by the first radiation element 130 using a coupling mechanism, so as to form the first frequency band FB1. The fourth radiation element 170 is excited by the second radiation element 140 using another coupling mechanism, so as to form the third frequency band FB3. In addition, the first extension portion 146 of the second radiation element 140 is configured to fine-tune the impedance matching of the second frequency band FB2, and the second extension portion 166 of the third radiation element 160 is configured to fine-tune the impedance matching of the first frequency band FB1.

In some embodiments, the element sizes of the antenna structure 100 are as follows. The total length L1 of the feeding radiation element 120 and the first radiation element 130 may be substantially equal to 0.25 wavelength ($\lambda/4$) of the second frequency band FB2 of the antenna structure 100. The length L2 of the third radiation element 160 may be substantially equal to 0.25 wavelength ($\lambda/4$) of the first frequency band FB1 of the antenna structure 100. The length L3 of the fourth radiation element 170 may be shorter than 0.25 wavelength ($\lambda/4$) of the third frequency band FB3 of the antenna structure 100. The width of the first coupling gap GC1 may be from 1 mm to 2 mm. The width of the second coupling gap GC2 may be from 0.5 mm to 1 mm. The above ranges of element sizes are calculated and obtained according to many experiment results, and they help to optimize the operational bandwidth and impedance matching of the antenna structure 100.

Figure 3:
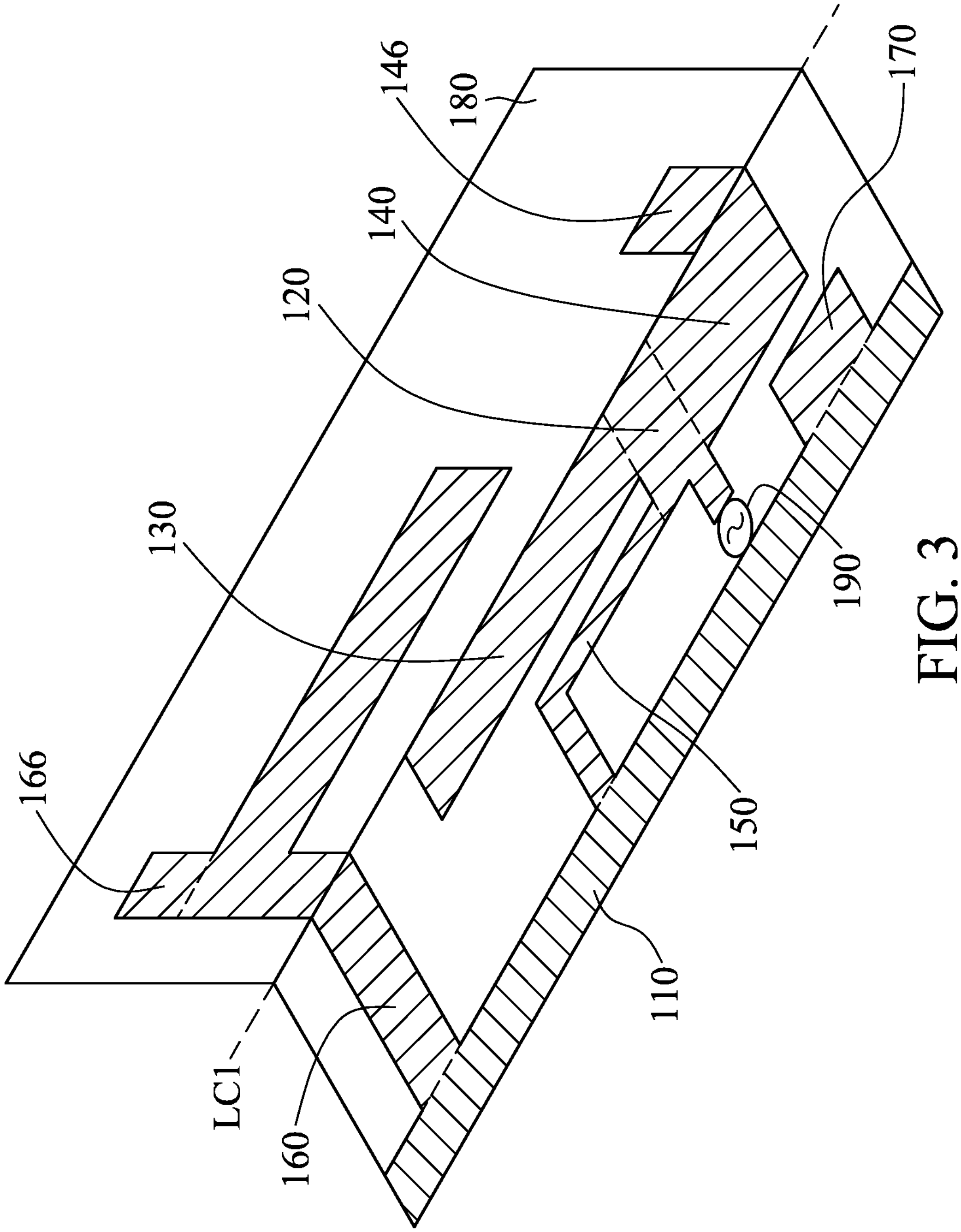
FIG. 3 is a perspective view of an antenna structure according to an embodiment of the invention.

FIG. 3 is a perspective view of an antenna structure 300 according to an embodiment of the invention. FIG. 3 is similar to FIG. 1. In the embodiment of FIG. 3, the antenna structure 300 is adjusted along a bending line LC1, such that at least one portion of the third radiation element 160 and the other radiation elements are disposed on two perpendicular planes, respectively. In other words, the antenna structure 300 is modified to a 3D (Three-Dimensional) antenna structure according to different requirements. Other features of the antenna structure 300 of FIG. 3 are similar to those of the antenna structure 100 of FIG. 1. Therefore, the two embodiments can achieve similar levels of performance.

Figure 4:
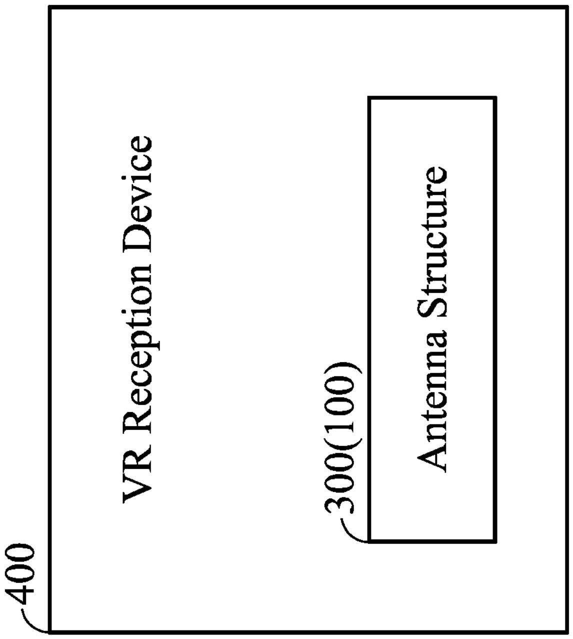
FIG. 4 is a diagram of a VR (Virtual Reality) reception device according to an embodiment of the invention.

FIG. 4 is a diagram of a VR (Virtual Reality) reception device 400 according to an embodiment of the invention. In the embodiment of FIG. 4, the VR reception device 400 includes the aforementioned antenna structure 300 (or 100), and thus the VR reception device 400 can support the function of wireless communication. In some embodiments, the VR reception device 400 further includes a display device, an RF circuit, a filter, an amplifier, a processor, and/or a housing, but it is not limited thereto. It should be noted that the 3D structure of the antenna structure 300 is slightly adjusted according to the appearance of the VR reception device 400, without affecting the communication quality thereof. Other features of the VR reception device 400 of FIG. 4 are similar to those of the antenna structure 300 of FIG. 3. Therefore, the two embodiments can achieve similar levels of performance.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-4. The invention may merely include any one or more features of any one or more embodiments of FIGS. 1-4. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a feeding radiation element, having a feeding point;

a first radiation element, coupled to the feeding radiation element;

a second radiation element, coupled to the feeding radiation element, wherein the second radiation element and the first radiation element substantially extend in opposite directions;

a shorting radiation element, wherein the feeding radiation element is further coupled through the shorting radiation element to the ground element;

a third radiation element, coupled to the ground element, wherein the third radiation element is adjacent to the first radiation element; and a fourth radiation element, coupled to the ground element, wherein the fourth radiation element is adjacent to the second radiation element;

wherein the second radiation element further comprises a first extension portion, and the first extension portion is positioned at one end of the second radiation element;

wherein the third radiation element further comprises a second extension portion, and the second extension portion is positioned at a bend in the third radiation element;

wherein the first extension portion and the second extension portion substantially extend in a same direction;

wherein the first extension portion and the second extension portion are positioned on a first plane;

wherein the ground element, the feeding radiation element, the first radiation element, the shorting radiation element, and the fourth radiation element are positioned on a second plane;

wherein the first plane and the second plane are substantially perpendicular to each other.

2. The antenna structure as claimed in claim 1, wherein a combination of the feeding radiation element, the first radiation element, and the second radiation element substantially has a T-shape.

3. The antenna structure as claimed in claim 1, wherein the shorting radiation element substantially has a relatively short L-shape, the third radiation element substantially has a relatively long L-shape, and the fourth radiation element substantially has a rectangular shape.

4. The antenna structure as claimed in claim 1, wherein a first coupling gap is formed between the third radiation element and the first radiation element, a second coupling gap is formed between the fourth radiation element and the second radiation element, a width of the first coupling gap is from 1 mm to 2 mm, and a width of the second coupling gap is from 0.5 mm to 1 mm.

5. The antenna structure as claimed in claim 1, wherein the antenna structure covers a first frequency band, a second frequency band, and a third frequency band, the first frequency band is substantially at 1575 MHz, the second frequency band is from 1910 MHz to 2170 MHz, and the third frequency band is from 3300 MHz to 4200 MHz.

6. The antenna structure as claimed in claim 5, wherein a total length of the feeding radiation element and the first radiation element is substantially equal to 0.25 wavelength of the second frequency band.

7. The antenna structure as claimed in claim 5, wherein a length of the third radiation element is substantially equal to 0.25 wavelength of the first frequency band.

8. The antenna structure as claimed in claim 5, wherein a length of the fourth radiation element is shorter than 0.25 wavelength of the third frequency band.

* * * * *